Oct. 11, 1949.  F. L. MOSELEY  2,484,639
FREQUENCY AND SPEED STABILIZING SYSTEM
Filed Feb. 28, 1947
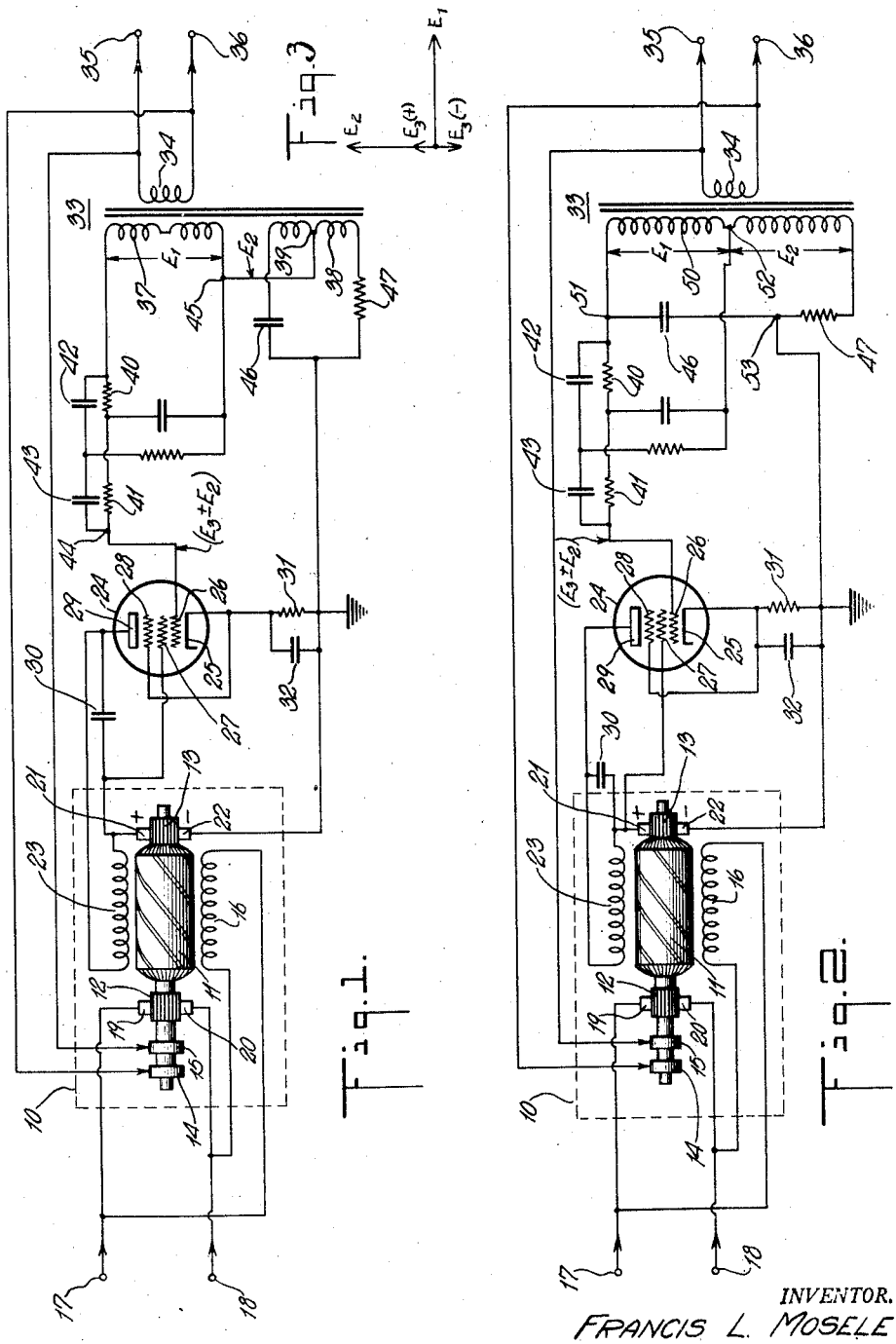
INVENTOR.
FRANCIS L. MOSELEY
BY John J. Rogan
ATTORNEY Patented Oct. 11, 1949

2,484,639

UNITED STATES PATENT OFFICE 2,484,639

FREQUENCY AND SPEED STABILIZING SYSTEM

Francis L. Moseley, Cedar Rapids, Iowa, assignor to Collins Radio Company, Cedar Rapids, Iowa, a corporation of Iowa Application February 28, 1947, Serial No. 731,479

5 Claims. (Cl. 321—28)

This invention relates to frequency stabilizing systems and more especially to an improved arrangement for stabilizing the frequency output of electric dynamotors and the like. In the electric control art, it very frequently is necessary to have available a supply of alternating current which is highly stabilized in frequency, notwithstanding that the only primary source available is a D. C. source. Usually this requires the use of an inverter of the dynamotor type. While various arrangements have been proposed heretofore for controlling the dynamotor speed within narrow limits, such arrangements have usually required relatively complex regulating circuits.

Accordingly, it is a principal object of this invention to provide an improved arrangement for converting D. C. to A. C. and with a maximum of stability in the converted alternating current.

Another object is to provide an improved direct current inverter system employing a dynamotor and special interlock speed regulating circuits for the dynamotor and its alternating output current.

A feature of the invention relates to a D. C. inverter system employing a dynamotor for converting low voltage direct current into high voltage direct current and also into an alternating current of highly stabilized frequency.

A further feature relates to a dynamotor type converter having a low voltage D. C. input winding, a high voltage D. C. output winding and slip rings for deriving stabilized alternating current; in conjunction with a phase sensitive bridge and electron tube for causing the said high positive D. C. winding also to act as a speed stabilizing winding for the dynamotor.

A still further feature relates to the novel organization, arrangement and relative interconnection of parts which cooperate to provide a simplified and improved system for stabilizing the speed of a motor and for deriving from a primary low voltage D. C. source, a high voltage D. C. output and a highly stabilized alternating current output.

Other features and advantages not specifically enumerated will be apparent after a consideration of the following detailed descriptions and the appended claims.

In the drawing,

Fig. 1 is a schematic wiring diagram of one embodiment of the invention.

Fig. 2 is a schematic wiring diagram of a modified embodiment of the invention.

Fig. 3 is a vector diagram explanatory of the operation of Figs. 1 and 2.

Referring to Fig. 1, there is shown a dynamotor 10, having a rotatable armature 11, the supporting shaft of which carries a pair of commutators 12, 13, and a pair of slip rings 14, 15, which are connected to suitable points on the D. C. commutator 12. The dynamotor has a low voltage D. C. input field winding 16, which is connected in circuit with the low voltage D. C. supply terminals 17, 18, through the intermediary of commutator 12 and its brushes 19, 20. Terminals 17, 18, may be connected to any suitable primary source such as a storage battery or the like. Also associated in inductive relation with armature 11 and connected in circuit therewith through commutator 13, and brushes 21, 22, is a high voltage D. C. output field winding 23.

In accordance with well-known dynamotor principles, when winding 16 and armature 11 are energized from the D. C. terminals 17, 18, the armature is driven at a rate of speed which can be regulated by the current flowing through winding 23. In other words, winding 16 furnishes the major portion of the field excitation required by the dynamotor, while the field winding 23 acts as a speed regulating winding and is connected in circuit through the high voltage commutator 21, with the plate-to-cathode circuit of a grid-controlled electron tube 24.

Tube 24 is preferably, although not necessarily, of the pentode type having an electron-emitting cathode 25, a control grid 26, a screen grid 27, suppressor grid 28, and plate or output anode 29. The screen grid 2 derives its D. C. operating potential by being connected to the positive brush 21. The plate 27 derives its D. C. operating potential by being connected to the positive brush 21 in series with winding 23. Preferably, winding 23 is shunted by a large condenser 30 to act as a filter to suppress commutator ripple and the like. In the conventional way, the suppressor grid 28 is connected directly to the cathode 25 which latter electrode is biased positively with respect to ground by the usual cathode bias resistor 31 and its by-pass condenser 32.

The input to the control grid of tube 24 is controlled by an audio frequency transformer 33, whose primary winding 34 is supplied with alternating current from the slip rings 14, 15. The alternating current output terminals 35, 36, are also connected to winding 34. Transformer 33 has two secondary windings 37, 38. Winding 38 is mid-tapped at 39, and this mid-tap is connected to one end of winding 37, the other end of winding 37 being connected to grid 26 through a filter network in the form of a frequency-sensitive bridge comprising resistance arms 40, 41, and capacity arms 42, 43. This filter network constitutes a Wien bridge, that is, an alternating current bridge of the general Wheatstone type but which is frequency-sensitive in that when it is balanced for a particular frequency, when that frequency is applied to the bridge input it produces no voltage in the bridge output. The grid-to-cathode of tube 24 is connected across the points 44, 45, of the Wien bridge network, which is adjusted, for example by variation of the resistors or capacitors, so that when the desired frequency appears at terminals 35, 36, zero output voltage $E_3$ appears at point 44 as a result of the energization of winding 37. However, the winding 38 is connected in a local circuit including capacitor 46 and resistance 47 so that the voltage $E_2$ applied to point 45 through the intermediary of winding 38 has a phase difference of 90° with respect to the voltage $E_3$ from winding 37 and passed by the Wien bridge filter. This vector relationship of the voltages $E_2$ and $E_3$ is illustrated in Fig. 3.

In Fig. 3, $E_1$ is the voltage which is induced in winding 37; $E_2$ is the voltage contributed by winding 38. Depending upon the frequency applied to winding 37, the output of the Wien bridge filter is shifted 90° above and below resonance and undergoes a phase reversal on either side of resonance as indicated by the vectors $E_3(+)$ or $E_3(-)$ of Fig. 3. If the applied frequency from winding 37 is too high, the output of the Wien bridge is represented by vector $E_3(+)$; if the frequency is too low, the output of the Wien bridge resulting from winding 37 is represented by the vector $E_3(-)$.

Consequently, when the dynamotor is delivering the correct frequency to terminals 35, 36, the control grid 26 receives a sustained alternating current voltage $E_2$ from winding 38 which is rectified by the detector action of tube 24 and the plate current of this tube therefore applies a standard reference value of current to the regulating field winding 23. Should the dynamotor increase its speed above the set value, the Wien bridge filter passes a voltage $E_3(+)$ from winding 37 which is in phase with the voltage $E_2$, thus increasing the positive voltage applied to grid 26, or at least reducing the negative bias on grid 26, so as correspondingly to increase the plate current of tube 24 which current flows through wind 23 and thereupon causes a reduction in the R. P. M. of armature 11 until the correct speed is reassumed. If the dynamotor decreases in speed, the Wien bridge filter passes a voltage $E_3(-)$ which is in phase opposition to the voltage $E_2$. It will be understood that the control grid 26 may be suitably biased by means of the resistor 31 and condenser 32, so as to provide a predetermined normal amount of plate current for tube 24 when the proper frequency is being generated by the dynamotor 10.

Referring to Fig. 2, there is shown an arrangement similar to that in Fig. 1 but with a simplification of the transformer which couples the A. C. output of the dynamotor to the Wien bridge filter. In the embodiment of Fig. 2, the parts which function the same as those of Fig. 1, bear the same designation numerals. In this embodiment, the windings 37 and 38 of the transformer 33, are combined into a single winding 50. The lower end of this winding is connected to the input terminal 51 of the Wien bridge filter through the phase shift elements 46, 47, which produces the necessary phase quadrature voltage represented by the vectors $E_3(+)$ or $E_3(-)$ of Fig. 3. In this embodiment, assuming the dynamotor is running at exact speed, a constant reference voltage exists between the points 52, 53, which voltage is 90° shifted from the main supply voltage supplied to the winding 50 by the transformer 33. This reference quadrature voltage is fed without further phase shift or attenuation directly through the elements 40, 41, 42, 43, to the control grid 26 of tube 24. Should the generated frequency from the dynamotor change, the filter network supplies an additional voltage which appears between points 44 and 53 and thus adds to or subtracts from the reference voltage across points 52 and 53. The remaining functioning of the system of Fig. 2 is the same as that of Fig. 1 already described.

While certain preferred embodiments have been described herein, it will be understood that various changes and modifications may be made therein without departing from the spirit and scope of the invention.

What is claimed is:

1. An arrangement for converting direct current into highly stabilized alternating current comprising an electric dynamotor having a single pair of field windings one winding being a D. C. field winding energized by said direct current, a pair of slip rings for deriving said alternating current at a frequency corresponding to the speed of the dynamotor, the other field winding of said dynamotor being a high voltage D. C. winding which is connected to a commutator said high voltage D. C. winding serving also as a speed regulator winding for the dynamotor, a grid-controlled electron tube whose plate circuit includes said high voltage direct current winding, an alternating current bridge filter connected to the control grid of said tube, and transformer means coupling said slip rings to the input of said bridge filter for applying thereto two voltages $E_1$, $E_2$ which are at phase quadrature to produce at the output of said bridge a voltage $(E_3 \pm E_2)$ where $E_3$ is the unbalance bridge current which is produced when said alternating current changes its frequency from that for which the bridge is balanced.

2. An arrangement according to claim 1 in which said transformer means includes a primary winding connected to the slip rings of said dynamotor, said transformer having a pair of secondaries, one of said secondaries being connected to the input of said bridge filter and the other secondary being provided with a phase-shifting network for applying to said bridge filter a voltage which is 90° out of phase with the voltage from said first winding.

3. An arrangement according to claim 1 in which said transformer means includes a transformer having its primary winding supplied from the slip rings of said dynamotor, and having a secondary winding one section of which is connected across the input terminals of said Wien bridge filter, and the other section of which is connected in circuit with said filter through a 90° phase shift network.

4. A D. C. converting arrangement comprising a source of low voltage direct current, a dynamotor having a single pair of field windings one of said field windings being a low voltage D. C. input winding, the other of said field windings being a high voltage D. C. output winding, said high voltage winding serving also as a speed regulating winding for the dynamotor a pair of slip rings for deriving an alternating current of standard frequency corresponding to the desired dynamotor speed, a commutator for connecting the low voltage direct current winding in circuit with said low voltage D. C. supply and with the armature of the dynamotor, another commutator for connecting the said high voltage D. C. output winding in circuit with the armature, a grid-controlled tube having its plate current circuit connected to said high voltage D. C. winding for supplying the D. C. plate voltage of the said tube, a balanced alternating current bridge filter having an output terminal connected to the control grid of said tube, and a transformer having its primary winding connected to said slip rings and having its secondary windings connected to an input terminal of said bridge to supply said bridge with two control voltages $E_1$, $E_2$ which are 90° out of phase with respect to each other, said bridge being balanced for said standard frequency and for producing a third voltage $E_3$ which is either in phase or 180° out of phase with said voltage $E_2$ depending upon the changed speed of said dynamotor with respect to its desired speed.

5. A speed control arrangement for an electric dynamotor and the like, said dynamotor having a single pair of windings one of which is a D. C. input winding for the dynamotor and the other of which is a D. C. output winding and also a speed regulator winding for the dynamotor, means to derive from the dynamotor an alternating current whose frequency is proportional to the dynamotor speed, and means to supply said regulator winding with a standard reference voltage corresponding to a standard frequency of said alternating current when the dynamotor is running at the required speed, the last-mentioned means including a network for deriving from said alternating current two alternating current voltages $E_1$, $E_2$, of the same frequency but with 90° phase difference, an alternating current bridge of the type which is balanced for said standard frequency, means to apply said 90° phase shifted voltage simultaneously to the input terminals of said bridge to produce at the output of said bridge a regulating voltage $E_3 \pm E_2$ where $E_3$ is the unbalance current from said bridge corresponding to a change in said standard frequency, and a grid-controlled tube whose input circuit is controlled by said voltage $E_3 \pm E_2$ and whose output circuit is connected to said regulating winding.

FRANCIS L. MOSELEY.

REFERENCES CITED

The following references are of record in the file of this patent:

UNITED STATES PATENTS

| Number | Name | Date |
| --- | --- | --- |
| 2,395,516 | Morton et al. | Feb. 26, 1946 |
| 2,395,517 | Stoller | Feb. 26, 1946 |